INVENTOR.
ROELOF E. SCHUIL
BY
AGENT

United States Patent Office 3,324,299
Patented June 6, 1967

3,324,299
PHOTO-ELECTRIC CELL COMPRISING A PRESSED AND SINTERED PHOTOSENSITIVE BODY
Roelof Egbert Schuil, Emmasingel, Eindhoven, Netherlands, assignor to North American Philips Company, Inc., New York, N.Y., a corporation of Delaware
Filed Feb. 10, 1965, Ser. No. 431,508
Claims priority, application Netherlands, Feb. 14, 1964, 6,401,302
7 Claims. (Cl. 250—211)

This invention relates to photo-electric cells comprising a photosensitive body of cadmium sulphide provided with electrodes, said body consisting of powder compressed and sintered into a compact body containing substantially balanced concentrations of activators and co-activators. It also relates to methods of manufacturing such photo-electric cells.

In photo-electric cells of the kind referred to, the activators employed are copper and/or silver, usually copper. These activators are necessary in fairly great concentration, for example $10^{-4}$ atoms per molecule CdS, to obtain a high photosensitivity, as is desirable for practical uses, in a substantially reproducible manner. However, to permit incorporation of so high a concentration of activators, it is necessary for maintaining balance of electrical charge (charge neutrality) to incorporate so-called co-activators which may consist of an element from column III or from column VII of the periodic table such as, for example, indium, gallium or a halogen. To obtain a high dark resistance and a high photosensitivity, the atomic concentrations of activators and co-activators are substantially balanced, that is to say chosen to have substantially equal values, on the understanding that, since a small excess of co-activator is already harmful to the dark resistance, the activator-coactivator ratio is usually chosen to be 1:0.95 for the sake of prudence. The activators and co-activators are incorporated into the powdery cadmium sulphide with the aid of a heating process and from this powder a compact body is pressed, for example, a thin plate which is sintered at the same time or afterwards by heating to a high temperature.

The pressed and sintered cadmium sulphide cells thus obtained have very favourable properties with regard to their photosensitivity and dark resistance. However, they suffer from the disadvantage of being too slow for certain uses, for example, for the use as an interruptor cell in a converter of direct current into alternating current. During the steadily alternating switching on and off, the switch-on period at low intensity of illumination, for example, at 50 lux, is approximately 80 milliseconds and at high intensity of illumination, for example, at 2000 lux, approximately 35 milliseconds, whereas the switch-off period at low intensity of illumination and high intensity of illumination is 70 milliseconds and approximately 30 milliseconds respectively. The term "switch-on period" is to be understood herein to mean the period of time which elapses between the instant of switching-on the illumination and the instant when the photocurrent has reached 90% of its ultimate value, and the term "switch-off period" is to be understood to mean the period of time which elapses between the instant of switching-off and the instant when the photocurrent has decreased to 10% of its initial value. For certain important uses, such as the interruptor in a converter of direct current into alternating current, the rate of switching at high intensity of illumination is especially important, but an improvement in the rate of switching at a low intensity of illumination is likewise desirable for other uses. The said disadvantage of excessive slowness is otherwise also inherent in other cadmium sulphide photocells which have not been manufactured by pressing and sintering but by applying likewise in known manner powdery cadmium sulphide together with a dissolving salt such as, for example, cadmium chloride to a carrier and then sintering the powdery cadmium sulphide at a comparatively low temperature while volatilizing the dissolving salt. Due to the different method of preparation and often also of activation, the photo-electric cells manufactured by the last-mentioned method frequently respond differently to impurities added to the cadmium sulphide than do the photo-electric cells manufactured by pressing and sintering and to which the present invention relates.

An object of the invention is inter alia to provide a simple step which, when applied to the pressed and sintered photocells of the kind mentioned in the preamble, permits of obtaining considerably shorter switch-on and switch-off periods for low intensity of illumination and also especially for high intensity of illumination in combination with values for the photosensitivity and dark resistance which are suitable for practical use.

According to the invention, a photocell of the kind mentioned in the preamble comprises a photo-sensitive body of cadmium sulphide provided with electrodes, which body consists of powdery cadmium sulphide compressed and sintered into a compact body containing substantially balanced concentrations of activators and co-activators. The cadmium sulphide body contains, in addition to the aforementioned concentration of activators and co-activators a concentration of at least $10^{-5}$ atoms per molecule CdS of one or more elements increasing the rate of switching and selected from the group constituted by lead, strontium, calcium, barium, magnesium and potassium.

In fact, it has been found that adding the elements from the aforementioned group in addition to the activators and co-activators usually employed in the pressed and sintered cells, results in a considerable reduction of switch-on period and switch-off period for low intensity of illumination and especially also for high intensity of illumination, probably because these elements act as a rapid recombination center in the activated material thus manufactured. Although the photosensitivity is also decreased slightly by the said addition, the gain in the rate of switching largely counterbalances this, at least for several uses, in the sense that a combined rate of switching, photosensitivity and dark resistance suitable for many uses is thus obtained, which combination has hitherto been found impossible for cadmium-sulphide cells in another simple manner.

The required concentration of elements increasing the rate of switching depends inter alia on the values of the photosensitivity and on the rate of switching desirable for a certain use, since the concentration is also determinative for the photosensitivity and speed. Although individual differences may occur for the various elements, it generally suffices to use a concentration lower than $10^{-2}$ atoms per molecule CdS, and although under certain conditions higher concentrations could be used, the said upper limit is still preferably maintained because above this limit chemical conversions may occur which might give rise to differing physical properties of the cadmium sulphide such as to be undesirable at least for certain uses. Especially concentrations between $10^{-3}$ and $10^{-5}$ atoms per molecule CdS have been found very suitable for potassium and alkaline-earth metals, the said elements already yielding a reduction in the switching periods by a factor of 2 to 3 at low intensity of the lumination, while the photosensitivity remains comparatively high. An addition of the said elements also yields an improvement in the rate of switching at comparatively high strength of illumination. On the ground of the experimental data already available it may also be concluded that lead is especially preferred as an addition for comparatively high strength of illumination. The preferred concentration for lead lies approximately between $5 \times 10^{-4}$ and $10^{-2}$ atoms per molecule CdS and with this concentration and at comparatively high strength of illumination reproducibly short switch-on periods and switch-off periods have already been obtained, which may be each from approximately 1 to 2 milliseconds, while still retaining a photosensitivity suitable for practical use and a favorable dark resistance.

In combination with a doping with the elements previously mentioned for the purpose of improving the rate of switching, the activator preferably used is copper and/or silver and the co-activator used is preferably gallium, the concentrations of activator and co-activator being relatively balanced and preferably lying between approximately $10^{-3}$ and $10^{-5}$ atoms per molecule CdS.

In manufacturing the photocell according to the invention one preferably proceeds in such manner that, before pressing and sintering the powder, one or more of the aforementioned elements increasing the rate of switching is or are added in the desired concentration to the initial powder, for example, at the same time as the activator and co-activator are added, and homogeneously incorporated in the powder by a temperature treatment between, for example, 800° C. and 1100° C. Subsequently, before proceeding to pressing and sintering, the resulting powdery cadmium sulphide is homogeneously mixed with powdery cadmium oxide in a content of at least 0.1% by weight and at most 10% by weight or, instead of the cadmium oxide, a cadmium compound is added which dissociates at the sintering temperature into cadmium oxide with a corresponding content and one or more other constituents volatile and/or unharmful to the photo-conduction, for example, cadmium carbonate. It is to be noted that this mixing with cadmium oxide or a cadmium-oxide compound is already known per se for pressed and sintered photocells. However, it has been found that this known method is also preferably used in connection with the addition of elements increasing the rate of switching, which forms the subject of the present invention. A compact body may be pressed in the usual manner, as well as sintered, the latter process usually being effected at a temperature between 700° C. and 1200° C.

In order that the invention may be readily carried into effect, several embodiments thereof will now be described in detail, by way of example, with reference to the accompanying diagrammatic drawing, in which.

Figures 1, 2:
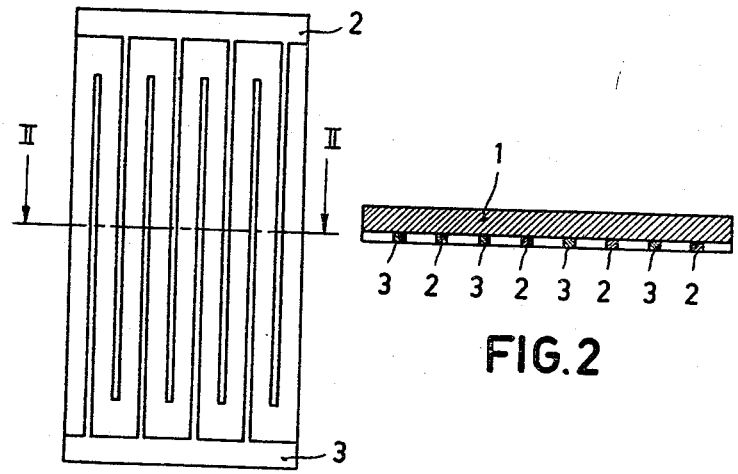
FIGURE 1 is a plan view of the photosensitive cadmium-sulphide body with electrodes forming part of a photocell.
FIGURE 2 is a view of the corresponding cross-section on the broken line II—II of FIGURE 1.
Figure 3:
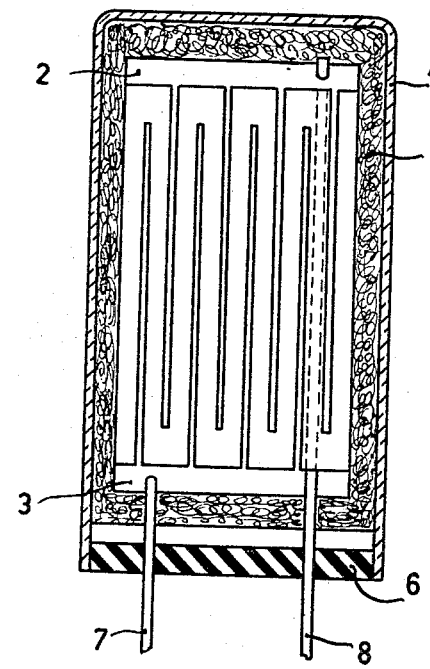
FIGURE 3 shows a longitudinal section of an example of a completely finished photocell according to the invention.

By way of illustration of the invention the manufacture and the measuring results will now be described for a plurality of photo-cells according to the invention doped with several of the aforementioned elements increasing the rate of switching in comparison with a known photocell manufactured simultaneously in the same manner and which differs from the photocells according to the invention only by the absence of the said elements increasing the rate of switching.

To this end, eight equal quantities each of 100 gms. of pure cadmium sulphide powder are weighed out. To each of the eight charges of 100 gms. are added 1.5 ccs. of an aqueous $Cu(NO_3)_2$ solution containing 8.794 mgs. of copper per cc. and 1.5 ccs. of an aqueous $Ga(NO_3)_3$ solution containing 9.167 mgs. of gallium per cc. These additions correspond to a concentration of $3 \times 10^{-4}$ atoms of the activator copper and $2.85 \times 10^{-4}$ atoms of the co-activator gallium per molecule CdS.

Besides, a further concentration of elements increasing the rate of switching is added to seven out of the eight charges, that is to say an addition differing for each of the seven charges, as follows:

*Charge I.*—0.5 ccs. of an aqueous $Pb(NO_3)_2$ solution containing 28.7 mgs. of lead per cc. This addition corresponds to a concentration of $10^{-4}$ atoms lead per molecule CdS.

*Charge II.*—0.5 ccs. of an aqueous $Sr(NO_3)_2$ solution containing 12.13 mgs. of strontium per cc. This addition corresponds to $10^{-4}$ atoms Sr per molecule CdS.

*Charge III.*—0.5 ccs. of an aqueous $Ba(NO_3)_2$ solution containing 19.05 mgs. of barium per cc. This addition corresponds to a concentration of $10^{-4}$ atoms barium per molecule CdS.

*Charge IV.*—0.5 ccs. of an aqueous $Mg(NO_3)_2$ solution containing 3.36 mgs. of magnesium per cc. This addition corresponds to a concentration of $10^{-4}$ atoms of magnesium per molecule CdS.

*Charge V.*—0.5 ccs. of an aqueous $KNO_3$ solution containing 7.67 mgs. of potassium per cc. This addition corresponds to a concentration of $10^{-4}$ atoms potassium per molecule CdS.

*Charge VI.*—0.5 ccs. of an aqueous $Ca(NO_4)_2$ solution containing 5.55 mgs. of calcium per cc. This addition corresponds to a concentration of $10^{-4}$ atoms calcium per molecule CdS.

*Charge VII.*—5 ccs. of an aqueous $Pb(NO_3)_2$ solution containing 28.7 gs. of lead per cc. This addition corresponds to a concentration of $10^{-3}$ atoms lead per molecule CdS.

*Charge VIII.*—Contains only the said additions of copper and gallium.

After intimate mixing of each charge, the charges are dried by heating for 24 hours at, for example, 120° C.

Subsequently, each charge is heated at 850° C. for 3 hours in an atmosphere consisting of $H_2S$ and nitrogen. This heating serves to incorporate the added activators into the grains of the cadmium sulphide powder by diffusion.

The powder thus activated of each charge is now ground to fineness and 1 gm. of powdery CdO is homogeneously mixed with each charge.

A plurality of cadmium sulphide plates with dimensions $32 \times 11 \times 1$ mm.³ are now manufactured from each charge by pressing at a pressure of approximately 7000 kgs./sq. cm., the plates thus pressed subsequently being sintered and heated for half an hour at, for example, 950° C. in a flowing atmosphere of nitrogen.

Each cadmium sulphide plate is provided on one side with an interdigital electrode pattern as shown in FIGURES 1 and 2. On a cadmium sulphide plate 1 are two interdigitally intermeshing electrodes 2 and 3, which are applied by evaporation-deposition in known manner and consist of, for example, an alloy of gold and indium (95% by weight of Au and 5% by weight of In). Each line is, for example, approximately 200 microns wide and the spacing between two adjacent lines of different electrodes is approximately 800 microns.

The resulting photosensitive cadmium-sulphide bodies 1 covered with electrodes 2 and 3 are finally completed in the usual and known manner and, to this end, slid into a, for example, flat glass envelope 4 which fits with small clearance around the plate 1. The envelope is filled with a silico-organic grease 5 up to near a seal 6 which consists of synthetic material, for example, an epoxy resin. One supply wire 7 is connected to the lower side of the plate and hence to one half 3 of the electrode pattern and another supply conductor 8 is connected to the upper side of the plate and hence to the other half 2 of the electrode pattern.

The rate of switching and the photosensitivity of the photocells from the various charges are now measured and this first of all at a comparatively low intensity of illumination of approximately 50 lux with the aid of a tungsten band lamp (colour temperature 2800° C.).

Three photocells from each charge are measured, the measuring results together with the dopes being shown in the table following hereinafter, the value specified for each charge being the mean value of the three photocells which relatively differ only slightly for each charge.

From measurements on the photocells from the charges II to VI including it was found that, even at high intensity of illumination, these cells showed an analogous improvement by at least a factor of 2 to 3 as was also found at low intensity of illumination. For high intensity of

| Charge No. | Activator | Coactivator | Further addition | Switch-on period in milliseconds | Switch-off period in milliseconds | Photo-sensitivity in milliamps. |
|---|---|---|---|---|---|---|
| I    | $3 \times 10^{-4}$ Cu | $2.85 \times 10^{-4}$ Ga | $10^{-4}$ Pb   | 70 | 60 | 1 |
| II   | $3 \times 10^{-4}$ Cu | $2.85 \times 10^{-4}$ Ga | $10^{-4}$ Sr   | 35 | 25 | 5 |
| III  | $3 \times 10^{-4}$ Cu | $2.85 \times 10^{-4}$ Ga | $10^{-4}$ Ba   | 45 | 40 | 10 |
| IV   | $3 \times 10^{-4}$ Cu | $2.85 \times 10^{-4}$ Ga | $10^{-4}$ Mg   | 40 | 35 | 4 |
| V    | $3 \times 10^{-4}$ Cu | $2.85 \times 10^{-4}$ Ga | $10^{-4}$ K    | 30 | 25 | 4 |
| VI   | $3 \times 10^{-4}$ Cu | $2.85 \times 10^{-4}$ Ga | $10^{-4}$ Ca   | 40 | 35 | 10 |
| VII  | $3 \times 10^{-4}$ Cu | $2.85 \times 10^{-4}$ Ga | $10^{-3}$ Pb   | 60 | 15 | 0.5 |
| VIII | $3 \times 10^{-4}$ Cu | $2.85 \times 10^{-4}$ Ga | None           | 80 | 70 | 10–12 |

The various magnitudes have been measured at low intensity of illumination of 50 lux and at a voltage of 10 volts applied between the electrodes 2 and 3.

When comparing the properties of the photocells from charges II to VI including with the properties of the photocells from charge VIII which have been manufactured in known manner it appears that in the first mentioned photocells according to the invention both the switch-on period and the switch-off period are reduced by a factor of 2 to 3, while the photosensitivity, although decreased slightly, still has a value which may be regarded as very high for cadmium-sulphide cells. The dark resistance of the cells according to the invention generally was still lower than that of the known cells from charge VIII and was, for example, upwards of 1000 megohms.

Of charge I and charge VII, each of which relates to the addition of lead, it can be observed that they show already a slight improvement with respect to charge VIII even at low intensity of illumination, which is especially true of charge VII. The great advantage of the addition of lead and the resulting considerable improvement becomes manifest more clearly, however, when the photocell properties of charge I and especially those of charge VII are compared to those of charge VIII at high intensities of illumination, for example, of 2000 lux. For such an intensity of illumination of approximately 2000 lux, which intensity is frequently used in opto-electronic circuits, the switch-on and switch-off periods of charge I are 15 milliseconds and 10 milliseconds respectively and for charge VII from 1 to 2 milliseconds and from 2 to 3 milliseconds respectively, while for this intensity of illumination the switch-on and switch-off periods of the known cells from charge VIII are approximately 35 milliseconds and 30 milliseconds respectively. As may be seen from the above-mentioned table, the photosensitivity of the cells doped with lead is also lower, however, than that of the other cells. True, the table relates to an intensity of illumination of 50 lux, but at higher intensity of illumination the photosensitivity, that is to say the light resistance in the cadmium sulphide, decreases proportionately so that substantially the same ratio between the photosensitivities of the cells from the various charges is retained even at higher intensity of illumination.

However, the gain in rate of switching of the cadmium-sulphide cells doped with lead fully counterbalances the somewhat lower photosensitivity which otherwise still has a value which is high enough for many uses. Besides, a resistance which is not too low upon illumination, that is to say a comparatively low photosensitivity, is just desirable for certain uses where such a high rate of switching is wanted, such as, for example, in the use as an interruptor cell for converting direct current into alternating current. The dark resistance of the cells doped with lead is generally considerably higher than that of the known cells. Thus, the cells doped with lead exhibit a very favourable combination of rate of switching, photosensitivity and dark resistance.

illumination the improvement in the rate of switching of the cells doped with lead is generally considerably greater so that lead is to be preferred especially at high intensity of illumination and for high rates of switching. However, in other cases where, for example, at low intensity of illumination, a comparatively fast cadmium-sulphide cell is desired, the cells doped with alkaline-earth metals or potassium are also important and in this connection it may be observed that the last-mentioned cells generaly have a photosensitivity higher than that of cells doped with lead. Provisional experiments also point in this direction that, upon further increase in concentration of the alkaline-earth metals and potassium up to, for example, $10^{-3}$, an analogous improvement in the rate of switching is still obtained but no further improvement is obtained, at least not to the extent as is the case with lead, while the photosensitivity at these higher concentrations does not decrease or at least not to an appreciable extent.

In conclusion it is to be noted that the invention is not limited to the examples given hereinbefore and that many variations are possible for a man skilled in the art within the scope of the invention. Thus, for example, the concentration of elements increasing the rate of switching can be varied, as well as the concentrations of the amounts of activator and co-activator which are matched to each other. It is also possible to combine two or more of the said elements. In the manufactere of photocells by means of the pressing and sintering technique variations in the temperatures and duration of the heating process are naturally possible, as well as in the way of adding the elements.

What is claimed is:

1. A photo-electric cell comprising a pressed and sintered photosensitive body of cadmium sulphide powder containing substantially balanced concentrations of activators and co-activators and in addition a concentration of at least $10^{-5}$ atoms per molecule CdS of at least one element selected from the group consisting of lead, strontium, calcium, barium, magnesium, and potassium, and spaced electrodes on the photosensitive body, whereby increased switching speed is obtained in comparison with that obtained from the same cell without the additional element.

2. A photo-electric cell as set forth in claim 1 wherein the additional element is present in a concentration not more than $10^{-2}$ atoms per molecule CdS.

3. A photo-electric cell as set forth in claim 1 wherein the additional element is selected from the group consisting of potassium, strontium, calcium, barium, and magnesium and is present in a concentration range between approximately $10^{-5}$ and $10^{-2}$ atoms per molecule CdS.

4. A photo-electric cell as set forth in claim 1 wherein the additional element is lead and is present in a concentration range between approximately $5 \times 10^{-4}$ and $10^{-2}$ atoms per molecule CdS.

5. A photo-electric cell as set forth in claim 1 wherein the activator is copper or silver and the co-activator is gallium, both being present in substantially equal concentrations between $10^{-3}$ and $10^{-5}$ atoms per molecule CdS.

6. A photo-electric cell comprising a photosensitive body and spaced electrodes on the body, said body comprising a pressed and sintered mixture of cadmium sulphide powder containing substantially balanced concentrations in the range of $10^{-3}$ to $10^{-5}$ atoms per molecule CdS of activators and co-activators and in addition a concentration of at least $10^{-5}$ and not more than $10^{-2}$ atoms per molecule CdS of at least one element selected from the group consisting of lead, strontium, calcium, barium, magnesium, and potassium, whereby increased switching speed is obtained in comparison with that obtained from the same cell without the additional element.

7. A photo-electric cell as set forth in claim 6 wherein the mixture includes between 0.1% and 10% by weight of cadmium oxide or a cadmium compound which during sintering dissociates forming cadmium oxide.

References Cited
UNITED STATES PATENTS

| | | | |
|---|---|---|---|
| 2,706,792 | 4/1955 | Jacobs | 250—211 X |
| 2,930,999 | 3/1960 | Van Santen et al. | 338—15 |
| 2,957,152 | 10/1960 | Van Gool et al. | 338—15 |
| 3,142,586 | 7/1964 | Colman | 252—501 X |

WALTER STOLWEIN, *Primary Examiner.*